May 17, 1938. W. A. STROHL 2,117,523
AUTOMATIC BARREL TREATING MACHINE
Filed July 23, 1937 2 Sheets-Sheet 2
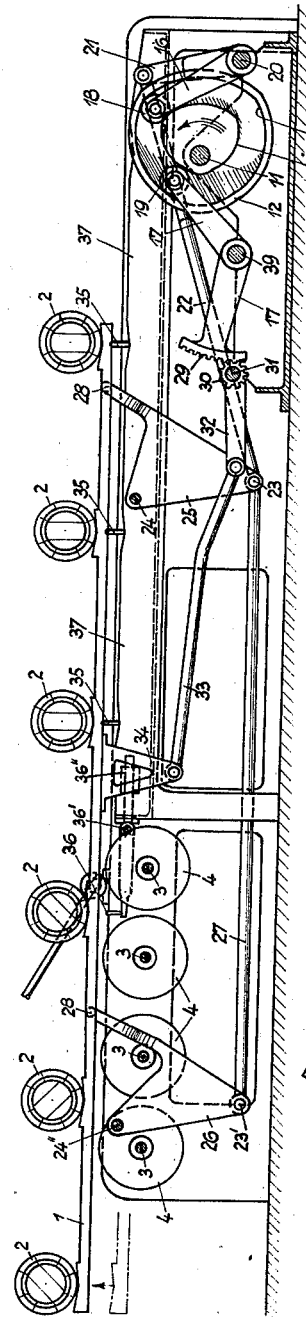
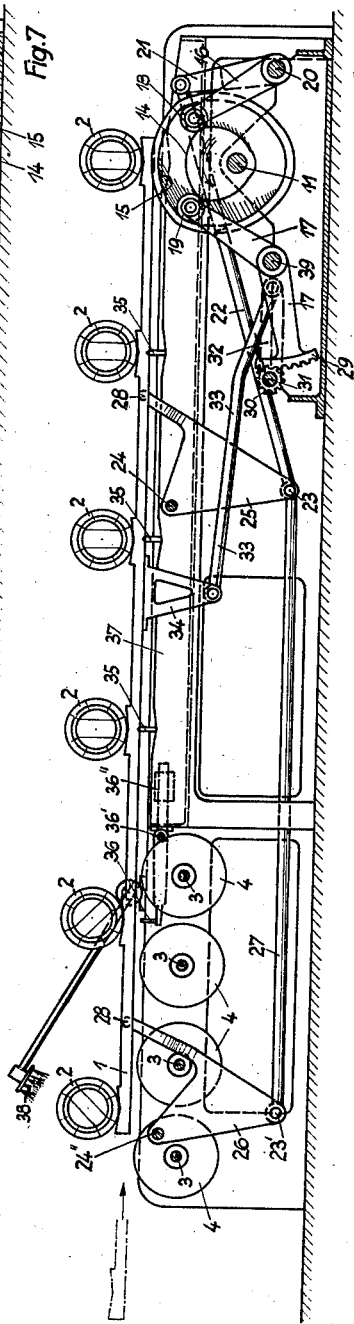
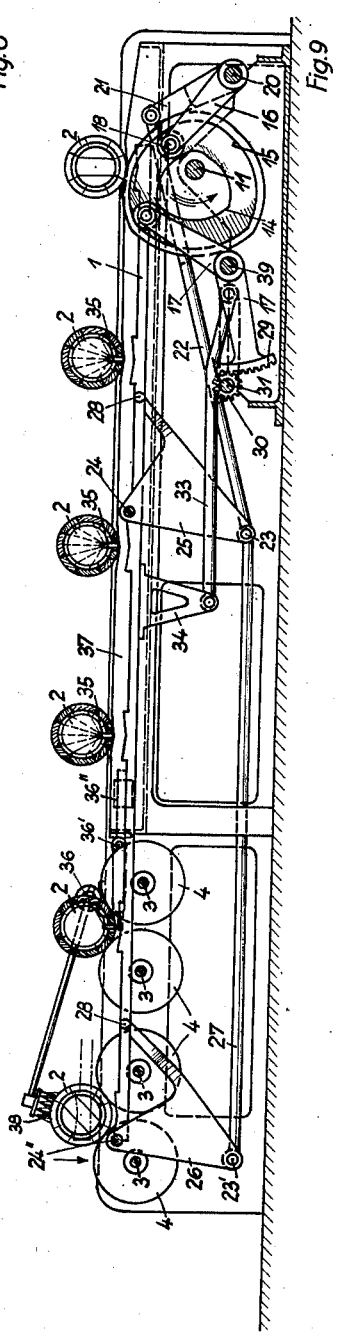
INVENTOR Patented May 17, 1938

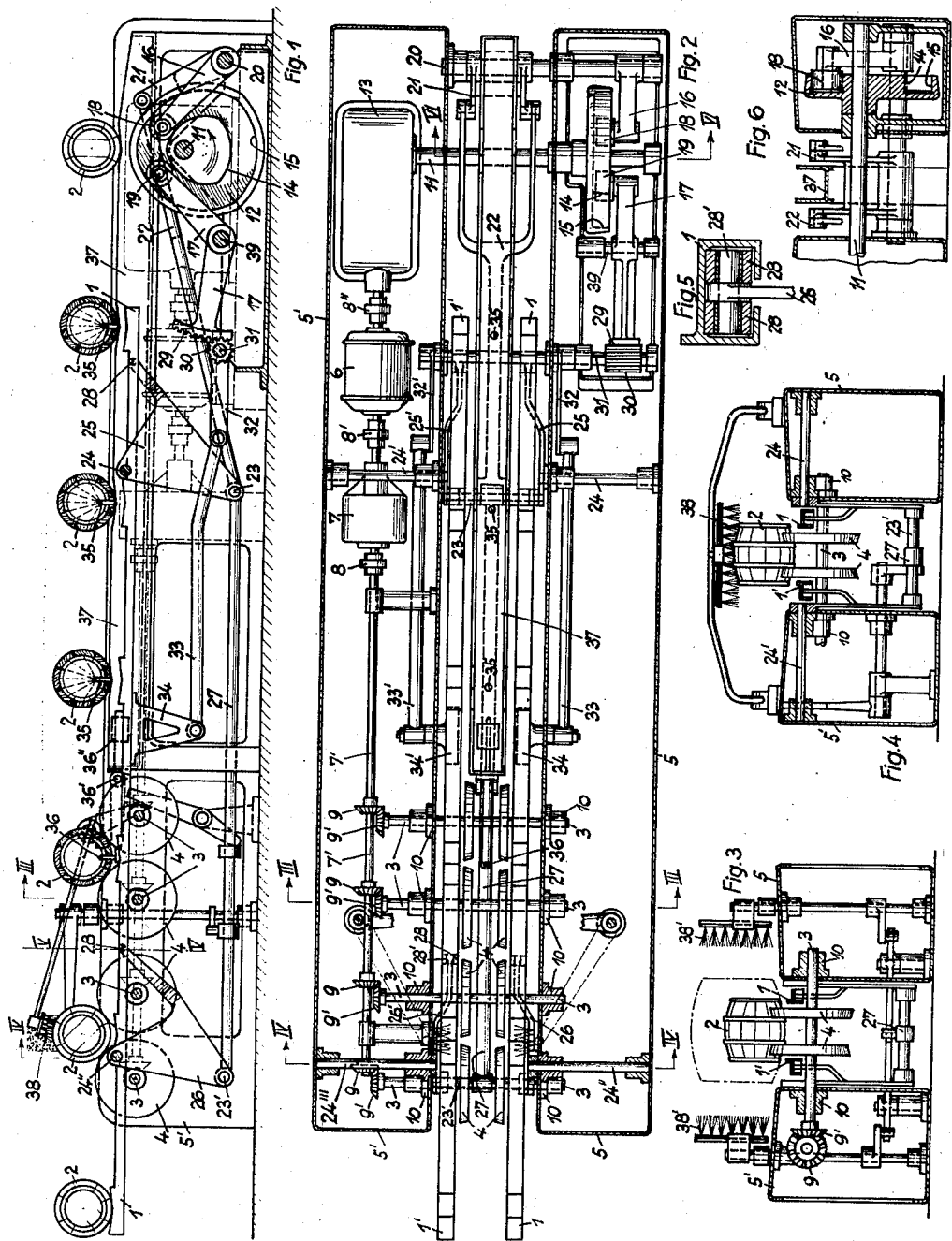

2,117,523

UNITED STATES PATENT OFFICE 2,117,523

AUTOMATIC BARREL-TREATING MACHINE

Walter August Strohl, Offenbach-on-the-Main, Germany

Application July 23, 1937, Serial No. 155,193
In Germany May 3, 1935

2 Claims. (Cl. 214—1)

My invention relates to automatic barrel-treating machines of that type in which barrels move through several stations where they are successively treated.

More particularly, my invention relates to the mechanism for carrying barrels from one station to the subsequent one.

Automatic barrel-treating machines are old in which rocking or vertically reciprocating members are provided for carrying the barrels.

Rocking members have the drawbacks that the barrels are carried along a semicircular path between stations, which requires an unnecessary expenditure of power for raising the barrels, and that a considerable percentage of the treating time is spent for carrying. At the same time, the residual rinsing water, pitch, etc. which is drained from the barrels while they are carried, is squirted about to all sides and soils the machine.

With reciprocating members, these drawbacks are eliminated but it is difficult to deal with the acceleration and deceleration of the members moving at right angles to one another, and the arrangement of the driving shafts and bearings for the pairs of barrel-rotating rollers intermediate the moving carrying members involves considerable complication.

According to my invention, the carrier bars are arranged above the driving shafts of the—comparatively large—barrel-rotating rollers, and movement in two directions at, or substantially at, right angles to each other is imparted to them by a cam plate. The movement is not uniform, being partly accelerated and partly decelerated. The cam plate has a groove with four interconnected sections. Independent mechanisms for imparting horizontal and vertical movement to the bars are operatively connected to, and are alternately operated by this cam plate.

By arranging the carrier bars above the shafts of the barrel-rotating rollers, it is possible to place the bearings and driving means of the shafts in a position where they are out of reach of rinsing and residual water. At the same time the usual distance between the stations is preserved. The rollers are made as large as practicable; for instance, with the usual gauge of about 40 inches, the diameter of the rollers is about 19 inches. The large rollers prevent lowering too far of even the smallest barrels so that there is always a clearance between the barrels and the shafts in which the carrier bars move unobstructedly.

In the accompanying drawings, a barrel-treating machine embodying my invention is illustrated by way of example.

In the drawings:

Fig. 1 is a vertical central section, and
Fig. 2 is a partly sectional plan view, of the machine.
Fig. 3 is a section on the line III—III in Fig. 2,
Fig. 4 is a section on the line IV—IV in Fig. 2,
Fig. 5 is a section on the line V—V in Fig. 1,
Fig. 6 is a section on the line VI—VI in Fig. 2,
Figs. 7, 8 and 9 are sectional elevations similar to Fig. 1 but showing various stages of operation Referring now to the drawings, and first to Figs. 1 and 2, it should be noted that while I have shown only two barrel-rotating stations, each with a pair of shafts 3, and a pair of rollers 4 on each shaft, any number of stations may be provided, as required or desired. The bearings 10 of the shafts 3 are secured to the inner faces of the inner walls of hollow frames 5 and 5' extending in parallel and in spaced relation along the machine. In the frame 5' the shafts are extended beyond their bearings and equipped with bevel gears 9' meshing with bevel gears 9 on a shaft 7' driven from an electric motor 6 in the frame 5' through clutches 8 and 8', and a gear box 7.

1 and 1' are a pair of carrier bars with seats for the barrels 2 at a distance equal to the distance between two barrel-rotating stations. The two bars are hollow, Fig. 5, and have vertical flanges at their inner sides.

24, 24' and 24'', 24''' are pairs of axially aligned shafts mounted in the frames 5 and 5'. Keyed on the ends of the shaft which project from the inner faces of the frames are pairs 25, 25' and 26, 26' of bellcranks whose lower ends are connected by stays 23 and 23', respectively.

At the upper end of each bellcrank I provide a pin 28' on which are seated two rollers 28 engaging in the cavity of the bars 1 and 1', as shown for the bar 1 and the bellcrank 26 in Fig. 5.

As will appear from Fig. 1, the rollers 28 of the four bellcranks support the carrier bars 1 and 1' above the roller shafts 3 in a space where interference with the barrels is prevented on account of the large diameter of the rolls 4 which is about equal to one-half the distance between two adjacent stations. This arrangement of the bars permits of positioning the bearings 10 at points where they are easily accessible for lubrication during operation while protected against dirt, and so their wear is a minimum.

The motor 6 housed in the frame 5', as described, is connected to gearing in a box 13 by a clutch 8''. A cam-plate shaft 11 is driven from the gear box 13 and on it is keyed a camplate 12 with a groove 14 and a rim 15. The groove has two diametrically opposite concentric, and two diametrically opposite eccentric portions. Levers 16 and 17, keyed respectively on shafts 20 and 39, engage in the groove 14 with rollers 18 and 19 at their respective free ends. A third lever 21 is also keyed on the shaft 20. A connecting rod 22 extends from the free end of lever 21 to the stay 23 of the first pair of bellcranks 25, 25', and 27 is a coupling rod extending from this stay to the stay 23' of the second pair 26, 26'. Lever 17 on the shaft 39 has an arm at whose free end is a sector 29 meshing with a pinion 30 on a transverse shaft 31 on which are keyed a lever 32 in the casing 5, and a lever 32' in the casing 5'. A connecting rod 33 extends from the lever 32 to a bracket 34 at the lower side of bar 1, and a similar rod 33' connects the lever 32' to a bracket 34' on the bar 1'.

35 are spray nozzles mounted on the bottom of a channel 37 which is fixed centrally between the bars 1 and 1' for conducting away the rinsing water. Its side walls make up a track for the finish-treated barrels which are lifted from the side walls or roll off them by gravity.

36 is a bung-hole finder in the shape of a double-armed lever fulcrumed at 36'. Its front end has a pin which enters the bung hole and its rear end supports a weight 36''.

A horizontal brush 38 is arranged above the barrels, and two vertical brushes 38' are arranged at the sides of the barrel. These brushes are operated through suitable connections, from the coupling rod 27 of the bellcrank pairs.

The operation of my machine is as follows: Fig. 1 shows the carrier bars 1, 1' at the lower end of their vertical, and at the forward end of their horizontal movement. A fresh barrel 2 has been placed on the seat at the front end of the bars, and the motor 6 is started to rotate the shafts 3 of the rollers 4 and the shaft 11 of the camplate 12.

Fig. 7 shows the position of parts after the camplate 12 has been rotated from its initial position, Fig. 1, through 90 degrees in the direction of the arrow, lever 16 having been thrown to the right by the eccentric portion of the cam groove 14 and having rocked the pairs of bellcranks anti-clockwise about their shafts 24 etc., causing the carrier bars 1, 1' to be elevated. Lever 17 is inactive as it is engaged by one of the concentric portions of the cam groove and so the carrier bars, with barrels 2, are only elevated and not shifted.

Conversely, shifting without elevation of the bars occurs upon further rotation through 90 degrees, Fig. 8. Lever 16 is now inactive but lever 17 is operated and, through the means described, shifts the bars 1, 1' to the right for a distance equal to the pitch of two barrel-rotating and other treatment stations, the bars moving on the rollers 28 at the upper ends of the bellcranks. This movement corresponds to a rotation of pinion 30 through about 180 degrees. The first barrel 2 is now above the rollers of the first rolling station, the second barrel is above those of the second station, which has the bung-hole finder 36 associated therewith, and the other barrels are each above one of the spray nozzles 35 in the channel 37.

Upon further rotation of the camplate through 90 degrees lever 16 is moved to the left, and back into its initial position, lowering the carrier bars and depositing the barrels 2 at their respective stations, Fig. 9. At the first barrel-rotating station, the barrel is rotated by the rollers 4 while being brushed, at the second rotating station the corresponding barrel is rotated until the bung-hole finder 36 enters its bung-hole, and the subsequent barrels are rinsed by the spray nozzles 35. Lever 17 is not operated.

Upon further rotation through 90 degrees the parts are returned into the initial position, Fig. 1 by operation of lever 17 while lever 16 remains stationary.

It will be understood that a complete cycle of elevating and shifting movements of the carrier bars 1, 1' is performed while the camplate shaft 11 rotates through 360 degrees. Each shifting movement of the carrier bars feeds the barrels to a subsequent station until the finish-treated barrels are lifted off the side walls of the channel 37, or run down automatically.

Owing to the configuration of the groove 14 in the camplate 12, the levers 16 and 17 are accelerated and decelerated gradually, the velocity of the vertical and horizontal movements of the carrier bars 1, 1' varying along a sine curve. Since the ends of levers 32, 32' move on arcs of a circle, the horizontal movement of the bars is again increased and reduced on a sine curve. The velocity of the carrier bars varies between zero at the ends of their strokes to an intermediate maximum. The sequence of movements imparted to the elevating and shifting mechanisms results in decelerated and accelerated vertical movements of the carrier bars without shocks.

It is understood that I am not limited to barrel-cleaning machines, as described, but that my invention includes all barrel-treating machines in which the barrels are fed from one station to a subsequent one.

I claim:

1. In an automatic barrel-treating machine, barrel-rotating and barrel-treating stations arranged in succession, shafts at each rotating station, a pair of rollers on each of said shafts, the rollers having a diameter which is substantially one-half the distance between two adjacent stations, a pair of housing frames extending longitudinally of the machine, bearings for said shaft located within said housing frames, carrier bars arranged at the sides of the pairs of said rollers and above said roller shafts, bell cranks mounted to oscillate and having their upper ends connected to said bars for vertically reciprocating the latter, means for shifting the bars longitudinally through the distance between two adjacent stations independently of the operation of said reciprocating means, and means having bearings within said housing frames for rotating said roller shafts and operating said bell cranks and said shifting means.

2. In an automatic barrel-treating machine, barrel-rotating and barrel-treating stations arranged in succession longitudinally of the machine, transverse shafts at each rotating station, a pair of rollers whose diameters are substantially one-half the distance between two adjacent stations, said rollers being mounted upon said shafts respectively, a pair of housing frames extending longitudinally of the machine, bearings for said shafts mounted within said housing frames, a drive shaft, beveled gears for transmitting power from said drive shaft to said roller shafts, carrier bars extending longitudinally of the machine at the sides of said pairs of rollers and above said roller shafts, bell cranks arranged in pairs and mounted to oscillate, said bell cranks having their upper ends connected to said bars for raising and lowering the latter, a cam shaft, a plate cam on said shaft having a single groove with two diametrically opposite concentric and eccentric portions and a pair of levers having followers cooperable with the groove in said cam, means operated by one of said levers to oscillate said bell cranks, thereby to raise and lower said bars, mechanism operated by the other of said levers to shift said bars longitudinally a distance equal to that between successive stations, and power means to rotate said drive shaft and said cam.

WALTER AUGUST STROHL.